United States Patent [19]

Hartsock

[11] Patent Number: 4,508,066

[45] Date of Patent: Apr. 2, 1985

[54] CERAMIC HEAD FOR INTERNAL COMBUSTION ENGINE

[75] Inventor: Dale L. Hartsock, Livonia, Mich.

[73] Assignee: Ford Motor Company, Dearborn, Mich.

[21] Appl. No.: 571,655

[22] PCT Filed: Dec. 27, 1983

[86] PCT No.: PCT/US83/02042

§ 371 Date: Dec. 27, 1983

§ 102(e) Date: Dec. 27, 1983

[51] Int. Cl.³ .............................................. F02B 75/08
[52] U.S. Cl. ........................ 123/41.71; 123/41.82 A; 123/193 H; 123/270
[58] Field of Search ..................... 123/270, 271, 41.41, 123/41.4, 41.34, 41.71, 41.76, 41.77, 41.82 R, 41.82 A, 193 CH, 193 H, 193 R, 668, 669

[56] References Cited

U.S. PATENT DOCUMENTS

| 1,784,421 | 12/1930 | Eslinger | 123/188 GC |
| 2,845,919 | 8/1958 | Petersen | 123/41.82 A |
| 4,340,019 | 7/1982 | Barnert et al. | 123/270 |
| 4,341,826 | 7/1982 | Prevo et al. | 123/193 R |
| 4,344,390 | 8/1982 | Heydrich et al. | 123/669 |
| 4,453,527 | 6/1984 | Wade | 123/193 H |

OTHER PUBLICATIONS

John Hartley, Ceramic Diesels, Dec. 1982, pp. 54–56.

Primary Examiner—Craig R. Feinberg
Assistant Examiner—David A. Okonsky
Attorney, Agent, or Firm—Joseph W. Malleck; Olin B. Johnson

[57] ABSTRACT

A head assembly is disclosed for an internal combustion engine. The assembly is comprised of a cast ceramic body with a coefficient of thermal expansion less than $1.0 \times 10^{-6}$ in/in/°F. (lithium aluminum silicate) fitting over the cylinder block of the engine to define a combustion chamber. The ceramic body has passages for hot gases extending between the combustion chamber and a side wall of the body, but the body contains no passages for conventional water cooling. A metallic shell sealingly clamps the ceramic body to the cylinder block of the engine; the shell supportably carries mechanical subassemblies which extend into the ceramic body for controlling the flow of gases therethrough. The shell carries at least part of the compressive loading imposed by the clamping.

10 Claims, 1 Drawing Figure

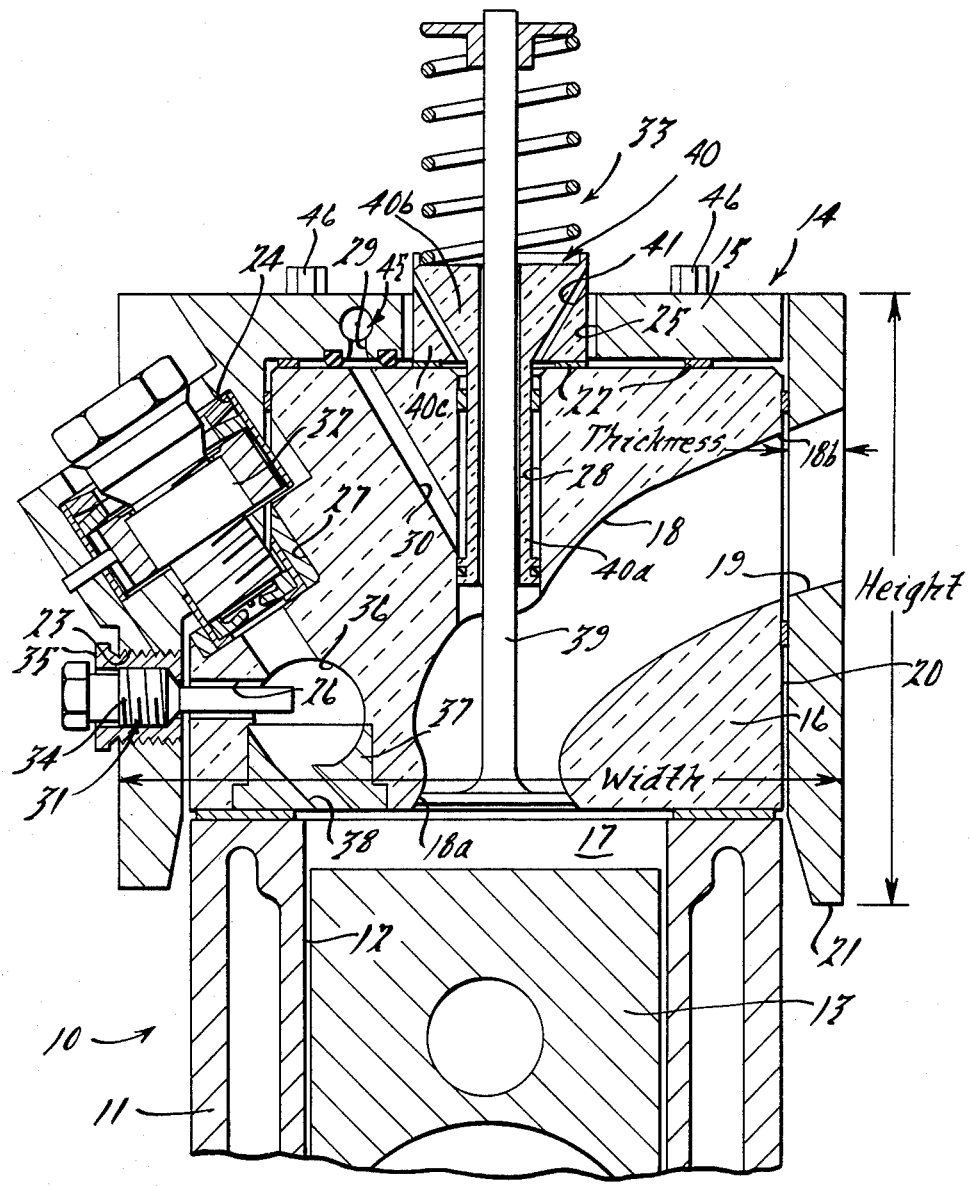

CERAMIC HEAD FOR INTERNAL COMBUSTION ENGINE

TECHNICAL FIELD

The invention relates to head constructions for internal combustion engines and particularly to the use of ceramic elements in such engines.

BACKGROUND OF THE INVENTION AND PRIOR ART STATEMENT

In most heat engines, higher temperatures produce greater engine efficiency. However, the metals used in conventional internal combustion engines cannot withstand a significant increase in operating temperatures over that now used without affecting durability. But ceramics can withstand such higher temperatures and can help to retain the heat of combustion within the engine (to be extracted from the exhaust gas such as by turbocharging) to increase engine efficiency.

While ceramics have desirable high temperature properties, they generally have low material strength, distort under high temperatures, and can frequently fail or crack due to machining flaws introduced by shaping the ceramic, making their use in engines less than desirable. This is exemplified in recent government sponsored research work in Japan (see "From Japan's Labs: Ceramic Diesels", by John Hurtly, Popular Science, December, 1982, pages 94-96). In this research work, Kyoto Ceramic tried the use of silicon nitride as a flat plate to insulate the head, and silicon nitride for the entire piston, as well as for loose fitting parts such as tappets, push rod tips, and rocker arm pads. It was found that silicon nitride was not as good an insulator as some other ceramics, did not have a coefficient of thermal expansion close to conventional metal parts of an engine, and could not be fitted closely for high temperature applications. In addition, the use of only a plate of ceramic at the head permitted considerable heat to leak from the gases in the metal head passages. This same problem is presented by the disclosure of U.S. Pat. No. 4,341,826.

NGK Spark Plug tried silicon nitride as the total material for critical components of the engine (such as the head, cylinder, piston, and crankshaft) and found that in components that received high stress, ceramic is at a disadvantage if it is the load receiving member. It is significant that the use of a ceramic head was not truly explored in this patent because the engine was of a two cycle type, inducting and exhausting gases through the cylinder wall and thus requiring only a plate of ceramic to close the cylinder. See "Ceramics Parts Take Shape", by John Hartley, Automotive Industries, September, 1982, pages 56-58. As with the effort of Kyoto Ceramic, the NGK effort failed to teach how a large mass of ceramic could be used as a head with internal hot gas passages; this is understandable since silicon nitride is difficult to fabricate in thick cross-sections due to the need to migrate nitrogen gas through the material during nitridation.

NGK Insulators is reputed, in the Popular Science article, to have employed stabilized zirconia as a blanket for insulating metal parts of the engine. No information is given as to how this may be facilitated, but it is offered that stabilized zirconia possesses a coefficient of thermal expansion which is 80% of cast iron, leaving an unsatisfactory differential if the ceramic is supported for sealing by the cast iron.

To applicant's knowledge, the art has not employed ceramics as the major constituent in weight of the material of either the block or the head of an internal combustion engine due to the above indicated limitations. Several problems deter such use of ceramics, including (a) the difficulty of fabricating ceramics in large bulk with complex passages as required in an engine head or block, (b) the difficulty of maintaining adequate strength within the engine housing when ceramic is stressed and is the principal constituent, and (c) adequately compensating for differential thermal expansion between differing materials in the housing if the housing is not made entirely of the same material.

SUMMARY OF THE INVENTION

The invention is a head assembly for an internal combustion engine, which assembly employs ceramic in a massive, thick body more effective to retain the heat of combustion in hot gases that pass through the head, while permitting nonceramic subassemblies to extend into the ceramic body for controlling the flow of the gases through the body.

The head assembly comprises: (a) a cast ceramic body having a side wall and another wall fitting over the cylinder block to define with the piston and cylinder block a combustion chamber, the ceramic body having passage means therethrough providing for flows of inducted combustion gases and compressed exhaust gases between said combustion chamber and said body side wall, the ceramic body being comprised of a material with a coefficient of thermal expansion less than $1.0 \times 10^{-6}$ in/in/°F.; and (b) shell means sealingly clamping said ceramic body to said cylinder block and supportably carrying means extending into said body for controlling the flow of gases through said body, the shell means carrying at least part of the compressive loading imposed by said clamping.

Preferably, the ceramic body is comprised of lithium aluminum silicate and has its smallest cross-sectional dimension no less than two inches. Advantageously, the body has overall dimensions of height/width/length in the ratio range of 1:1:1 to 1:3:10.

Preferably, the shell means is comprised of a material which has a coefficient of thermal expansion differing from the coefficient of thermal expansion for said ceramic body by no greater than 2 to $12 \times 10^{-6}$ in/in/°F.; advantageously, one or more compliant members are placed between the shell means and body to accommodate such differential, the compliant members preferably being comprised of high temperature sealing ring material or gasket material. Advantageously, the shell means is comprised of metallic members enveloping the ceramic body.

Preferably, the ceramic body has a wall defining a space for precombustion of inducted gases, and the means for controlling the flow of gases through the ceramic body comprises a precombustion apparatus extending through the shell means into the body and to the wall defining the precombustion space. A ceramic insulating member is advantageously placed between the ceramic body and at least a portion of the means for controlling flow (such as a valve stem). Means for fluidly cooling the insulating member may be employed (such means may include the use of pressurized oil directed between the insulating member and the valve stem).

SUMMARY OF THE DRAWINGS

The FIGURE is a central sectional elevational view of an internal combustion engine incorporating the features of this invention and showing a piston and mechanical subassemblies associated with the engine.

BEST MODE FOR CARRYING OUT THE INVENTION

Improved thermal efficiency for an engine is obtained by structuring the engine head of a massive thick ceramic body encased in a metallic shell, the compressive loads used to secure the head being distributed between the shell and body. The ceramic body is cast with elongated gas flow passages therethrough and of a low coefficient of thermal expansion material, lithium aluminum silicate, which material is not destructively affected by the sharp thermal gradient created by the hot gases.

As shown in the FIGURE, the internal combustion engine 10 comprises essentially a cast iron block 11 with walls defining one or more bore openings or cylinders 12 therein to receive a conventional piston 13 reciprocally operating in the bore opening. A head assembly 14 is comprised of a cast ceramic body 16 and a metallic shell 15 carrying means 18 for controlling the flow of gases therethrough. The ceramic body fits over the cylinder block to define with the cast iron block 11 and piston 13 a combustion chamber 17.

CAST CERAMIC BODY

The ceramic body 16 is cast as a unitary solid of a material having a coefficient of thermal expansion less than $1.0 \times 10^{-6}$ in/in/°F., and is easy to cast; the material is lithium aluminum silicate which has a coefficient of thermal expansion of up to $0.2 \times 10^{-6}$ in/in/F°. The body is devoid of fluid cooling passages, but has passage means 18, here comprised of elongated internal channels which include one or more intake passages (as shown) and exhaust passages (not shown). One end 18a of each channel 18 is in communication with the bore opening 12 when the ceramic body 16 is in an aligned position thereover, and an opposite end 18b in a side wall 20 of the body; the opening 18b is in communication with a complimentary opening 19 in the metallic shell. The channels provide for conducting gases to or from the combustion chamber over an important length during which considerable heat is lost in conventional head assemblies. The ceramic body has its smallest cross-sectional dimension (height, length or width) no less than two inches and has overall dimensions of height/width/length in the ratio range of 1:1:1 to 1:3:10. The ceramic body contains preformed openings 27, 26, 28 and 30 aligned with the port openings of the skeleton, as will be described.

METALLIC SHELL

Shell means 15 envelopes the ceramic body and sealingly clamps the body to the cylinder block. The compliant members act as localized seals, provide some insulation, and provide for some limited relative motion between the ceramic body and metallic shell due to a slight difference in the coefficient of thermal expansion of such materials, the latter being no greater than $1-12 \times 10^{-6}$ in/in/°F. Advantageously, the compliant members provide for a spacing of 0.001–0.10 inch. The shell means supportably carries means 18, extending into the body, for controlling the flow of gases through the ceramic body. The body is preferably formed from steel or cast iron plating having a coefficient of thermal expansion of about $6.0 \times 10^{-6}$ in/in/°F., and having a thickness/width/height ratio of 1:6:6 to 1:30:30. The shell means forms an exterior skeleton for the body and is open at its bottom 21 to fit like an envelope about the ceramic body in spaced relationship. Spacing is maintained by use of one or more compliant members 22 therebetween. Compression bolts 46 may extend from threaded seats in the block 11, through the ceramic body or alongside the ceramic body, to bear against shoulders on the shell. Compression forces typically are about 40,000 pounds per cylinder for a three inch diameter bore opening.

The shell has port openings 23, 24 and 25 which communicate respectively with preformed openings 26, 27 and 28 extending through the ceramic body. Such port openings are adapted to sealingly receive mechanical subassemblies, including, respectively, ignition means 31, fuel injector 32, and valve operating means 33. The latter mechanisms are threadably received in the port openings to hold and secure the subassemblies. The shell may also have an oil cooling delivery passage 29 aligned with an oil channel 30 defined in the ceramic.

The ignition means 31 for igniting the fuel and air in the combustion chamber 17 comprises a glow plug 34 carried by receptor 35 secured to the skeleton. The glow plug extends through opening 26 of the ceramic head block and into a prechamber 36. The precombustion chamber may have an independent ceramic member 37 (comprised of silica or silicon nitride) which is preshaped to complete said precombustion chamber with a nozzle channel 38 for directing a burning jet into the combustion chamber.

The fuel injector means 32 for metering fuel into the combustion chamber 17 comprises an injector assembly carried on a bias in the shell and aimed to send a fuel spray through stepped opening 27 into the precombustion chamber 36.

The valve operating means 33 for controlling the flow of gases through the ceramic body comprises a valve subassembly supported on the shell means. It comprises a spring biased valve with a valve stem 39 reciprocable (by use of a cam action, not shown) within a ceramic insulating sleeve 40. The sleeve 40 is a cylinder made of silicate, silicon nitride, silicon carbide, or zirconia, and has a portion 40a extending into the ceramic body in spaced relation and a portion 40b fitting and centered within the shell opening 25 by radial knobs 40c on the sleeve. Means for cooling the insulating sleeve comprise oil passages 41 which direct cooling fluid into the spacing between the sleeve 40 and the ceramic body 16.

I claim:
1. An insulating head assembly for an internal combustion engine having a cylinder block with walls defining at least one bore opening in each of which a piston reciprocates, said assembly comprising:
   (a) entirely a case ceramic body having a side wall and another wall fitting over said cylinder block to define with said piston and cylinder block a combustion chamber, said ceramic body having passage means through said body providing for flow of inducted combustion gases and compressed exhaust gases between said combustion chamber and said body side wall, said ceramic body being comprised of a material with a coefficient of thermal expansion less than $1.0 \times 10^{-6}$ in/in/°F.; and

(b) shell means enveloping and spaced from said body via compliant members and being effective to trap heat within said combustion chamber and passage means sealingly clamping said ceramic body to said cylinder block and supportably carrying means extending into said body for controlling the flow of gases through said body, said shell means carrying at least part of the compressive loading imposed by said clamping.

2. The assembly as in claim 1, in which said ceramic body is comprised of lithium aluminum silicate.

3. The assembly as in claim 1, in which said shell means is comprised of metallic members enveloping said body.

4. The head assembly as in claim 1, in which said cast ceramic body has overall dimensions of height/width/length in the ratio range of 1:1:1 to 1:3:10.

5. The assembly as in claim 1, in which said compliant members are placed between said shell means and body to accommodate a differential in coefficient of thermal expansion therebetween of between 1 to $12 \times 10^{-6}$ in./in/°F.

6. The assembly as in claim 5, in which said compliant members are comprised of high temperature resisting sealing material.

7. The assembly as in claim 1, in which said means for controlling the flow of gases through said body comprises valve subassemblies supported on said shell means.

8. The assembly as in claim 7, in which said body has a wall defining a space for precombustion of inducted gases, said means for controlling the flow of gases through said body further comprising a precombustion apparatus extending through said shell means into said body and to said wall defining said precombustion space.

9. The assembly as in claim 8, which further comprises a ceramic insulating member placed between said body and a portion of the means for controlling the flow of gases through the body, and means for fluidly cooling substantially only said ceramic insulating member.

10. The assembly as in claim 9, in which said portion of the means for controlling the flow of gases comprises a valve stem, and said means for fluidly cooling comprises pressurized cooling oil directed between said insulating member and valve stem.

* * * * *